US012729070B2

(12) United States Patent
Benedetti

(10) Patent No.: US 12,729,070 B2
(45) Date of Patent: Sep. 8, 2026

(54) ASSEMBLY FOR THE CONVEYANCE OF HORTICULTURAL PRODUCTS

(71) Applicant: UNITEC S.P.A., Lugo (IT)

(72) Inventor: Luca Benedetti, Ravenna (IT)

(73) Assignee: UNITEC S.P.A., Lugo (IT)

( * ) Notice: Subject to any disclaimer, the term of this patent is extended or adjusted under 35 U.S.C. 154(b) by 57 days.

(21) Appl. No.: 18/876,050

(22) PCT Filed: Jun. 12, 2023

(86) PCT No.: PCT/EP2023/065587

§ 371 (c)(1),
(2) Date: Dec. 17, 2024

(87) PCT Pub. No.: WO2023/247235

PCT Pub. Date: Dec. 28, 2023

(65) Prior Publication Data

US 2025/0382139 A1 Dec. 18, 2025

(30) Foreign Application Priority Data

Jun. 21, 2022 (IT) ........................ 102022000013039

(51) Int. Cl.
*B65G 43/08* (2006.01)
*B65G 47/26* (2006.01)
(Continued)

(52) U.S. Cl.
CPC ............. *B65G 43/08* (2013.01); *B65G 47/26* (2013.01); *B65G 47/28* (2013.01); *B65G 47/82* (2013.01);
(Continued)

(58) Field of Classification Search
CPC ........ B65G 43/08; B65G 47/82; B65G 47/26; B65G 47/28; B65G 2201/0211
(Continued)

(56) References Cited

U.S. PATENT DOCUMENTS 4,273,649 A 6/1981 Leverett
4,411,366 A * 10/1983 De Greef .............. B65G 69/16 209/912
5,044,504 A * 9/1991 Powell, Jr. ............ B65G 17/32 209/592

FOREIGN PATENT DOCUMENTS

FR 2682941 A1 4/1993
GB 1506672 A 4/1978
(Continued)

OTHER PUBLICATIONS

International Search Report for Application No. PCT/EP2023/065587, dated Aug. 25, 2023, 3 pages.
(Continued)

*Primary Examiner* — James R Bidwell
(74) *Attorney, Agent, or Firm* — CANTOR COLBURN LLP

(57) ABSTRACT

An assembly for conveyance of horticultural products, which includes a component configured for moving, along a predefined path, a number of resting seats for respective horticultural products, which are aligned longitudinally along the path. The assembly further has a device for repositioning the horticultural products, which is arranged along the path and is configured to transfer a horticultural product arranged in one of the seats into an adjacent seat.

10 Claims, 8 Drawing Sheets

(51) Int. Cl.
*B65G 47/28* (2006.01)
*B65G 47/82* (2006.01)

(52) U.S. Cl.
CPC ................. *B65G 2201/0211* (2013.01); *B65G 2203/0233* (2013.01)

(58) Field of Classification Search
USPC ........................................ 198/397.03, 397.02
See application file for complete search history.

(56) References Cited

FOREIGN PATENT DOCUMENTS

WO WO-2015181844 A1 * 12/2015 ............. B65G 47/28
WO WO-2022218821 A1 * 10/2022 ............. B07C 5/342

OTHER PUBLICATIONS

Italian Search Report for Application No. 2022000013039, dated Feb. 8, 2023, 8 pages.
Written Opinion for Application No. PCT/EP2023/065587, dated Aug. 25, 2023, 6 pages.
Australian Office Action for Application No. 2023290015, dated Jan. 9, 2026, 3 pages.
Chilean Office Action for Application No. 202403884, dated Jan. 8, 2026, 48 pages with translation.

* cited by examiner 1
8
D
3
D
8
3
8
3
7b
8
3
7a
8
C
3
8
3
7
7b
3
8
8
D
8
B

4
C
7
7b
A
2
7b
8
D

4
C
7
7a
7a
A
2
8
D 1
3
3
3
4
3
3
6
3
3
5
3
3
B 100
b
a

ASSEMBLY FOR THE CONVEYANCE OF HORTICULTURAL PRODUCTS

CROSS-REFERENCE TO RELATED APPLICATIONS

This application is a 35 U.S.C. § 371 National Stage patent application of PCT/EP2023/065587, filed on 12 Jun. 2023, which claims the benefit of Italian patent application no. 102022000013039, filed on 21 Jun. 2022, the disclosures of which are incorporated herein by reference in their entirety.

TECHNICAL FIELD

The present disclosure relates to an assembly for the conveyance of horticultural products.

BACKGROUND

As is known, automated lines are widespread which are capable of conveying fruit and horticultural products in general along predefined trajectories so that they can undergo treatments of various kinds and/or in order to transfer them between stations and processing centers of various types.

These assemblies are usually integrated into automated plants or lines used by companies operating indeed in the field of packaging and distribution of horticultural products, in order to combine contrasting requirements such as satisfying increasingly numerous, demanding and price-conscious customers, on the one hand, and meeting continuously and increasingly evolving quality standards on the other.

Within this field, conveyance is performed by various constructive solutions, which are distinct in terms of the reference technology as well as the way in which the conveyance is provided, particularly as regards the ability or not to control the position of each product along the path. The choice of a specific type of conveyance system rather than another, obviously depends on the requirements of the case, on the nature and problems of the product involved, and on the performance that one seeks to achieve.

In the context outlined above, conveyance assemblies are therefore well known in which there is a plurality of seats which can move cyclically along an annular path, which defines with a portion thereof the corresponding trajectory imposed on the products, arranged one by one in the seats. For example, solutions of this type may comprise a chain or belt which drives a series of cylindrical or otherwise axially symmetric rollers, oriented along an axis that is perpendicular to the advancement direction and arranged so that a product can be placed on the gap between two consecutive rollers, remaining rested between the respective portions of the mutually opposite lateral surfaces of said rollers.

Typically, an attempt is made to "saturate" the assembly by ensuring that a respective product is placed in each seat: evidently, this allows to maximize the number of products conveyed in the unit time and therefore the productivity of the system.

When complete saturation is not required, it is often sufficient to use appropriate refinements to ensure that each product is placed in a respective seat, without worrying about which and how many seats actually receive a product.

Sometimes, instead, while the presence of a plurality of (potential) seats is welcome, the presence of products on adjacent seats poses a problem, for example in those cases in which the range of action of other devices or elements that have to operate along the path is so wide as to cause the risk of interference with the products that are close to those on which they are actually called to operate (even to the point of causing impacts or damage). Alternatively, the need may arise to apply to each product (by means of the rollers) a rotation that is independent of the one imposed on the others, and this obviously is not possible if there is a product in the adjacent seat, resting on the other side of the same roller on which the product to be rotated in each instance is resting.

Under such conditions, difficulties that are not easy to solve arise.

In fact, the upstream stations normally operate on products conveyed haphazardly and the elements assigned to orderly delivery to the seats are conceived and optimized for saturation of the line, certainly not for a partial filling of the seats. Moreover, control of the delivery of the products to the seats is not infrequently subject to positioning errors.

SUMMARY

The aim of the present disclosure is to solve the problems described above, providing an assembly that allows to convey horticultural products in an orderly manner, ensuring an adequate spacing between them at least for a portion of the trajectory imposed on said products.

Within this aim, the disclosure provides a method that allows to convey horticultural products in an orderly manner, ensuring an adequate spacing between them at least for a portion of the trajectory imposed on said products.

Another features of the disclosure is to provide an assembly provided with a plurality of seats for respective individual horticultural products conveyed in line that uses suitable measures in order to prevent the downstream delivery of products arranged on two consecutive seats.

Another advantage of the disclosure is to provide an assembly and a method that allow to correct a wrong arrangement of the products performed by the upstream elements.

The disclosure provides an assembly and a method that ensure an adequate spacing between the products without compromising their quality and without causing any damage to them.

The disclosure also provides an assembly that ensures high reliability in operation.

The disclosure further provides an assembly that adopts a technical and structural architecture that is alternative to those of assemblies of the known type.

Not least features of the disclosure is to provide an assembly and a method that can be obtained easily starting from commonly commercially available elements and materials.

Yet another advantage of the disclosure is to provide an assembly and a method that have low costs and are of assured application.

This aim and these and other advantages that will become better apparent hereinafter are achieved by providing an assembly and a method according to the disclosure.

BRIEF DESCRIPTION OF THE DRAWINGS

Further characteristics and advantages of the disclosure will become better apparent from the description of a preferred but not exclusive embodiment of the assembly according to the disclosure, illustrated by way of non-limiting example in the accompanying drawings, wherein.

DETAILED DESCRIPTION OF THE DRAWINGS

Figure 1:
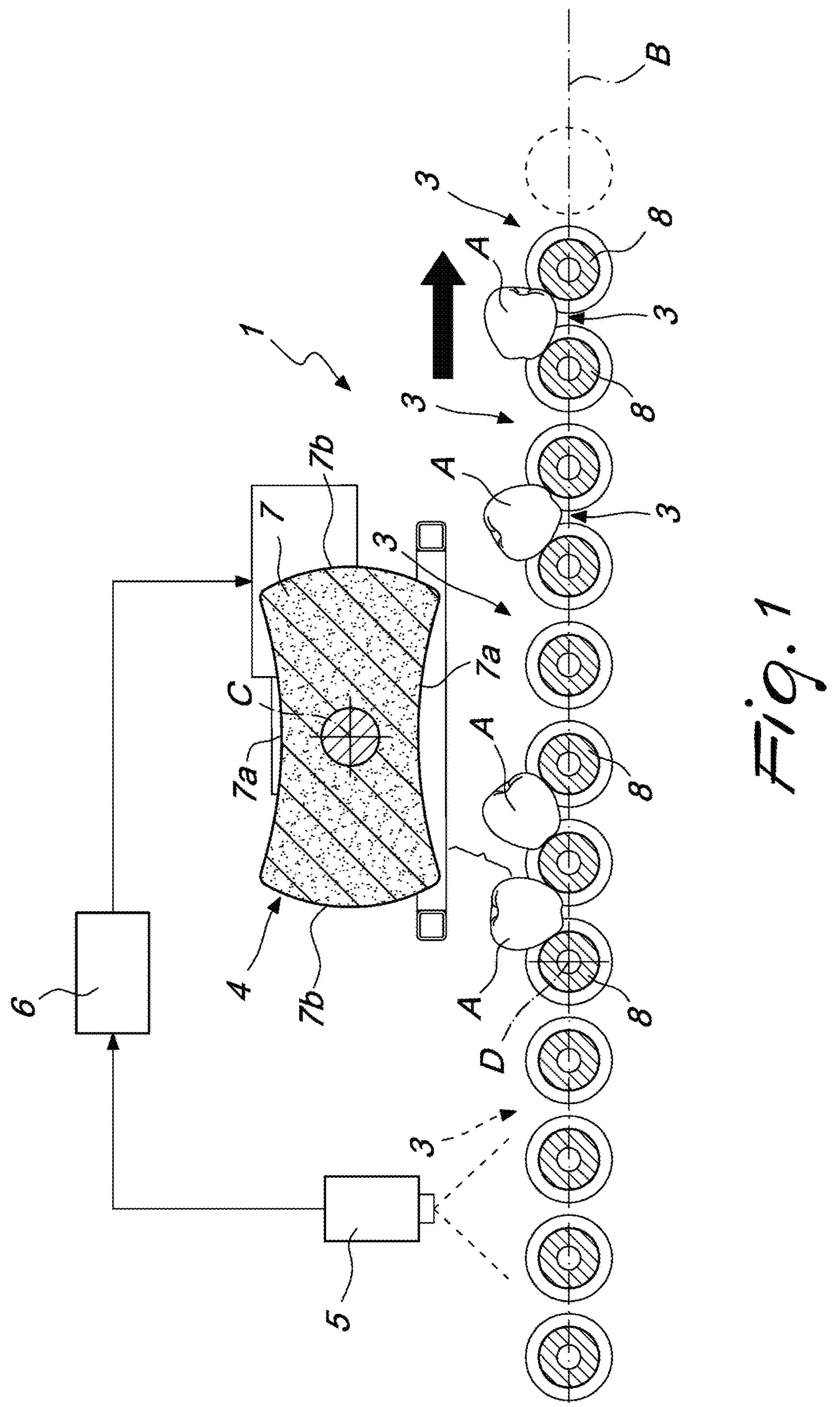
FIGS. 1 to 4 are lateral elevation and sectional views, taken along a longitudinal plane, of the conveyance assembly according to the disclosure in successive steps of operation.

With reference to the figures, an assembly for conveying horticultural products A is generally designated by the reference numeral 1.

Usually, the assembly 1 is designed to convey a specific type of horticultural product A, but the possibility that the same apparatus 1 may convey (at the same time or following a change of format) different types of products A is nevertheless within the protective scope claimed herein. Moreover, it should be pointed out that the assembly 1 can be used in relation to any horticultural product A (fruit, garden produce, vegetables, etcetera); the apples shown in the accompanying figures therefore illustrate only one possible example of application, which must in no way be understood as limiting the disclosure.

The assembly 1 can be used in any context and for any purpose (for example, therefore, for any activity of treatment and management of horticultural products A) without thereby abandoning the protective scope claimed herein.

The assembly 1 comprises means 2 for moving, along a predefined path B, a plurality of resting seats 3 for respective horticultural products A, which are aligned longitudinally along the path B (i.e., the seats 3 are aligned one after the other along the direction defined by said path B).

Typically, but not necessarily, the path B imposed on the seats 3 is annular and comprises a horizontal or slightly inclined rectilinear portion, along which the seats 3 convey the products A and which therefore defines the trajectory and advancement direction thereof (in the direction of the arrow shown in the accompanying FIGS. 1 to 4). The path B then comprises a return portion, in which the seats 3 are brought back to the cycle start position and along which, obviously, they do not convey the products A.

Within this scope, in the present description the terms "upstream", "downstream", "upstream of" and "downstream of" are therefore used (according to common usage) indeed with reference to the advancement direction of the products A imposed by the means 2 (from left to right in the accompanying figures).

According to the disclosure, the assembly 1 comprises a device 4 for repositioning the products A, which is arranged along the path B and is configured to transfer a product A arranged in one of the seats 3 into (toward) an adjacent seat 3. In other words, the device 4 is capable of transferring a product A into the subsequent seat 3 (downstream, or to the right in the accompanying figures) or into the preceding one (upstream, or to the left in the accompanying figures) with respect to the one in which it is arranged initially.

The device 4 may be configured to operate uniquely in one direction, i.e., only to transfer a product A into the next seat 3 or only into the preceding seat 3, or it may be able to transfer them in either direction, depending on the requirements of each product A. Evidently, this last option ensures greater versatility to the disclosure and may therefore be the preferred one in various contexts.

In any case, the device 4 takes care of remedying the unwanted presence of products A in two consecutive seats 3 by transferring one of them downstream or upstream and thus interposing an empty seat 3 between two seats 3 filled with consecutive products A, which are thus more spaced downstream of said device. The intended aim is thus already achieved.

The methods and criteria for control and activation of the device 4 may be any as a function of the specific requirements.

According to the disclosure, the assembly 1 comprises a system 5 for detecting horticultural products A, which is arranged (functionally) upstream of the device 4 and is configured at least to check for the presence of horticultural products A arranged in at least two consecutive seats 3.

In practice, the system 5 can be provided in any manner and may comprise any tool or element capable indeed of detecting (according to any technology) the presence of two products A on two consecutive seats 3 (or of "n" products A on "n" consecutive seats 3).

For example, therefore, the system 5 may comprise one or more photocells or other optical or presence sensors; as an alternative, the system 5 may comprise one or more video cameras or other electronic vision instruments, provided with software indeed capable of processing the images acquired in order to check for the presence of the products A. It should be noted that an assembly 1 such as the one described herein (and shown in the accompanying figures) can be used in a plant in which an electronic instrument of a known type, capable by means of video cameras of acquiring at least one parameter of interest (color, shape, sizes, sugar content, degree of ripeness, defectiveness), is already operating: in this case, the possibility is not ruled out that such an instrument can be configured to detect also the presence of horticultural products A arranged in at least two consecutive seats 3.

Other possible embodiments for the system 5 are in any case included within the protective scope claimed herein, for example by providing for the use of sensors of any type.

Furthermore, according to the disclosure the assembly 1 comprises an electronic control and management unit 6, functionally associated with the system 5 and with the device 4, which is configured to activate the device 4 as a consequence of the presence, detected by the system 5, of products A arranged in at least two consecutive (adjacent) seats 3. Thus, the device 4 operates automatically (by virtue of the unit 6) for the repositioning of the products A.

The electronic unit 6 can be of any type, and for example it can be a controller, a PLC or a computer; moreover, it can be dedicated solely to the processing of the data acquired by the system 5 and therefore indeed to the control of the device 4, or it may be a controller or a PLC that also performs other tasks. Typically, anyway, this is the same electronic element that oversees and governs the operation of the entire assembly 1 (and possibly of the plant in which it is inserted).

More particularly, the electronic unit 6 is provided with instructions for actuating the transfer of a product A, performed by the device 4, toward an adjacent seat 3 that contains no products A. This implies that, according to per se known methods, the system 5 and/or the electronic unit 6 are capable of identifying the most appropriate choice of the product A to be transferred and the seat 3 toward which it is to be sent. In greater detail, given the presence of two products A arranged on consecutive seats 3, the device 4 can transfer the first of the two products A that it encounters toward the downstream seat 3 (but not vice versa) or the one that follows toward the upstream seat 3 (but not vice versa). Both options are equally feasible when only two products A are arranged on consecutive seats 3: in the case of three products A arranged on three consecutive seats 3, the unit 6 will be capable of recognizing this condition and making the most correct transfer choice, in order to ensure the spacing and the repositioning of the products A in seats 3 that are empty and not already occupied by other products A. For this purpose, the unit 6 can be provided with instructions for periodically checking and storing, at preset time intervals, the upstream distribution of products A on a suitable number of consecutive seats 3 (preferably at the portion of the path B along which the system 5 operates), and for processing said information in order to indeed make the most suitable choice.

More generally, the unit 6 is provided with all the instructions necessary to perform the most correct choice(s) in each instance, as a function of the requirements and the condition of occupation of the seats 3 that occur (suitably detected by the system 5).

It is stressed that the functions described above, performed by the system 5 and/or by the unit 6 and associated with the operation of the device 4, may also be integrated in the latter without therefore the need for distinct components: the device 4 is able to recognize the most appropriate (empty) seat 3 into which to transfer the product A.

In the preferred embodiment, mentioned only by way of example of the application of the disclosure, the device 4 comprises an actuator, which is arranged proximate to the path B and can be activated selectively to transfer a product A arranged in a seat 3 into one of the adjacent seats 3 (by dragging it or pushing it).

Even more particularly, in the embodiment shown in the accompanying figures, which in any case does not limit the disclosure, the actuator comprises (or is constituted by) a contoured body 7, which is arranged above the path B (and the transiting products A) and rotates about an axis of rotation C which is transverse (preferably perpendicular) to the plane of arrangement of the path B.

The body 7 is normally kept facing the path B with at least one first portion 7*a* of its own lateral edge, which has a smaller radial distance and is configured for the free transit of the products A arranged in the seats 3.

It is specified that the radial distance is the one that can be measured between the edge of the body 7 and the axis of rotation C. Furthermore, the term "normal" condition is understood to mean the one in which the body 7 is arranged at the beginning of operation and which is kept until a repositioning of products A is required.

In other words, therefore, normally the body 7 is arranged (as in FIG. 1) so as to not oppose the passage of products A.

Instead, at least one second portion 7*b* of the lateral edge of the body 7 has a greater radial distance and is configured to intercept the trajectory imposed by the means 2 on the products A (and the products A) and therefore to transfer a product A arranged in a seat 3 toward one of the adjacent seats 3 as a consequence of the rotation of the body 7 in one of the directions of rotation about the rotation axis C.

For example, in the accompanying figures the first of two consecutive products A is intercepted and is transferred into the seat 3 directly downstream.

Preferably, but not necessarily, the body 7 is substantially axially symmetric.

More particularly, in the preferred embodiment, also shown in the accompanying figures in any case merely by way of example, the lateral edge of the body 7 is substantially composed of two first (curved) portions 7*a*, which face each other and are concave, and of two second (curved) portions 7*b*, which face each other, are convex and are interposed between respective first portions 7*a*.

It should be noted that in this configuration the body 7 can be normally kept facing the path B with any one of its two first portions 7*a* (a rotation through 180° is thus sufficient to return the device 4 to allowing the transit of the products A, after repositioning has occurred).

Figure 8:
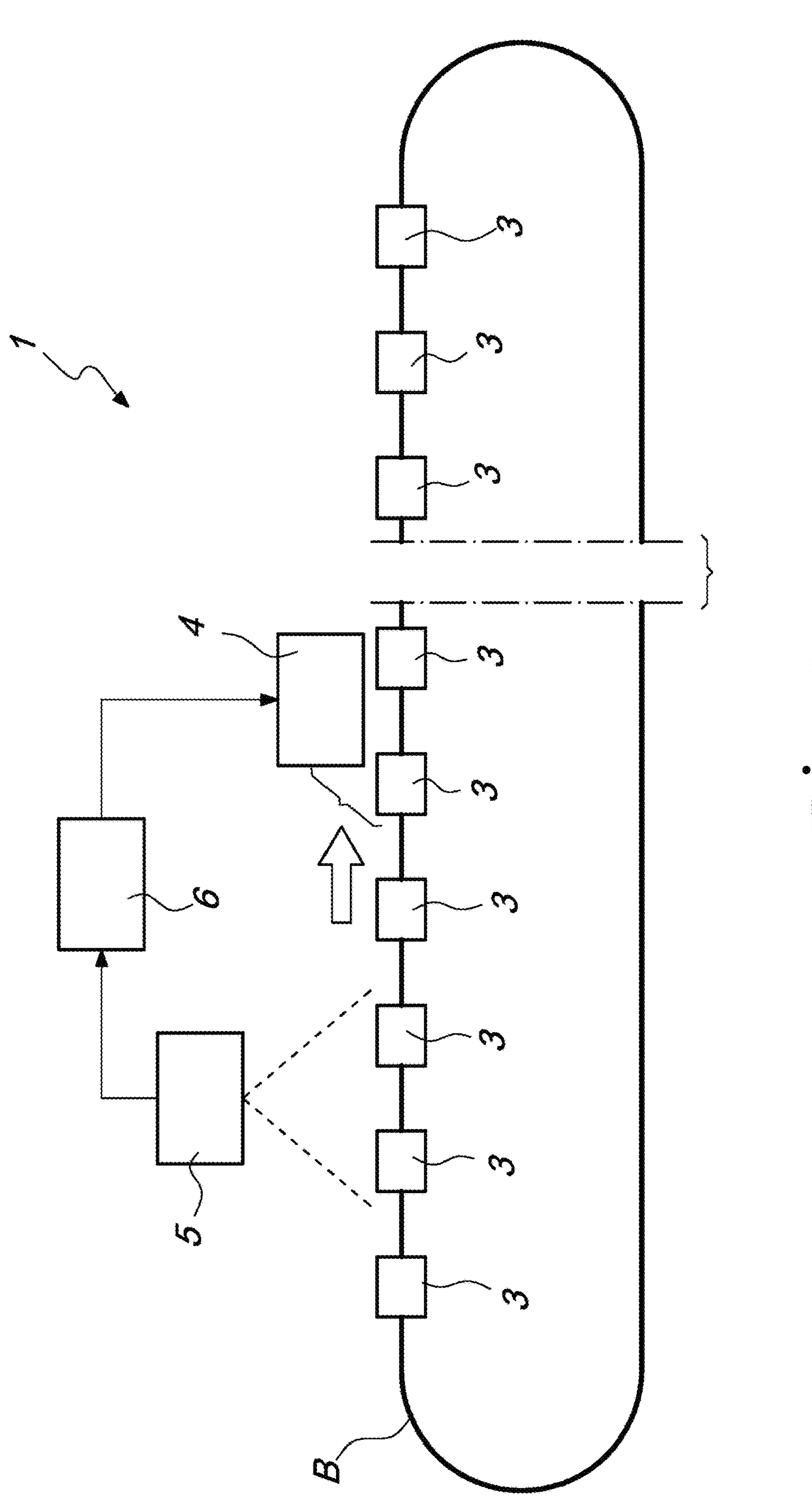
FIG. 8 is a schematic view of the assembly 1 according to the disclosure.
Figure 9:
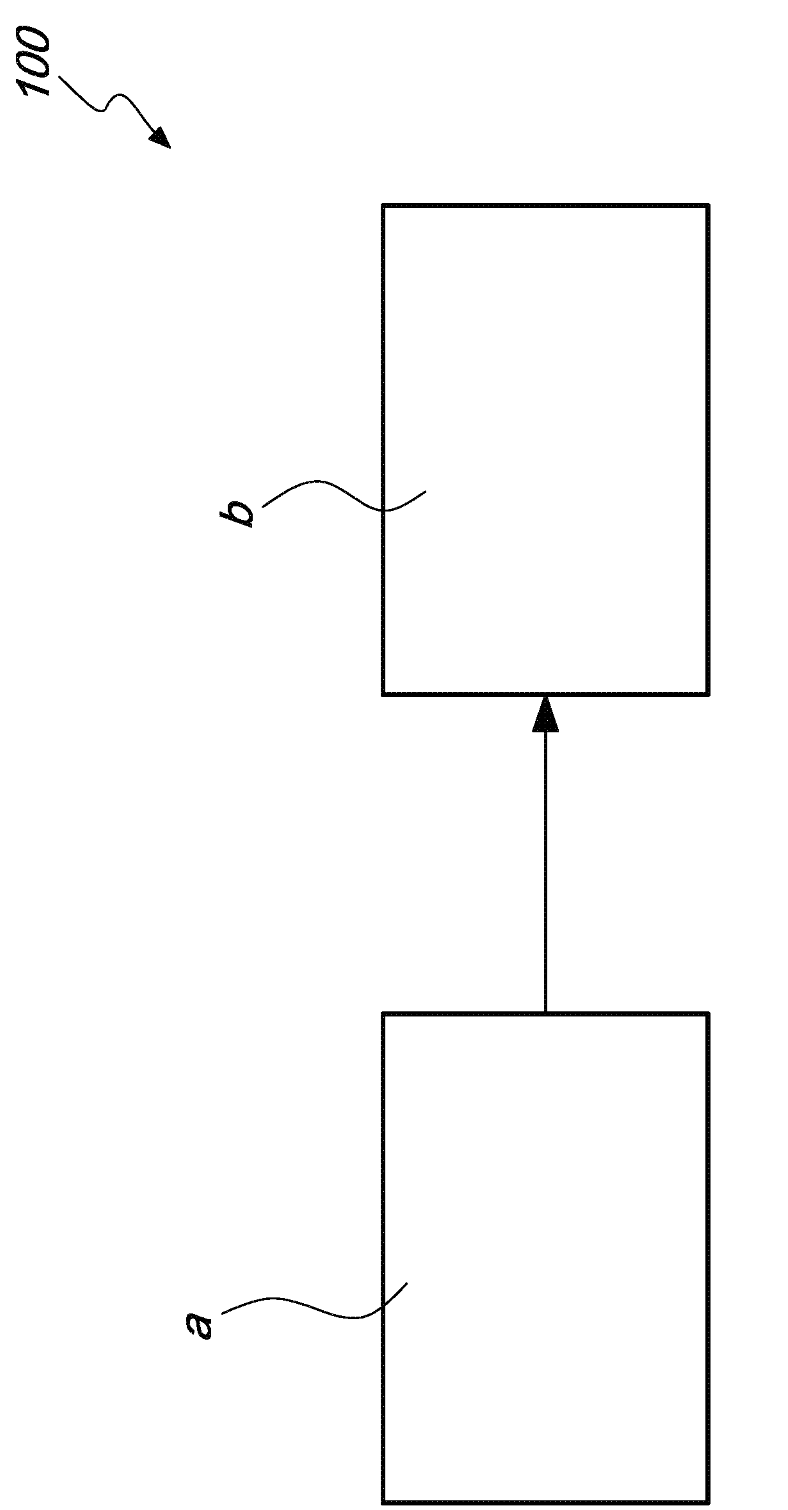
FIG. 9 is a block diagram of the method according to the disclosure.
Figure 9:
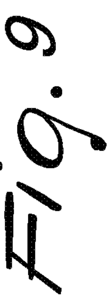

It is stressed that typically the path B lies on a vertical plane oriented along the advancement direction of the products A (it is the plane on which ideally FIGS. 1 to 4 lie): the rotation axis C is therefore preferably perpendicular to said plane and horizontal, although it might be slightly inclined with respect to the aforementioned condition of perpendicularity. Moreover, bearing in mind that FIG. 8 also provides (although schematically) a lateral view of the assembly 1 (and of the path B), the plane of arrangement is also the one on which indeed FIG. 8 lies (and in which the path B is even more clearly visible, with its return portion as well).

Figure 2:
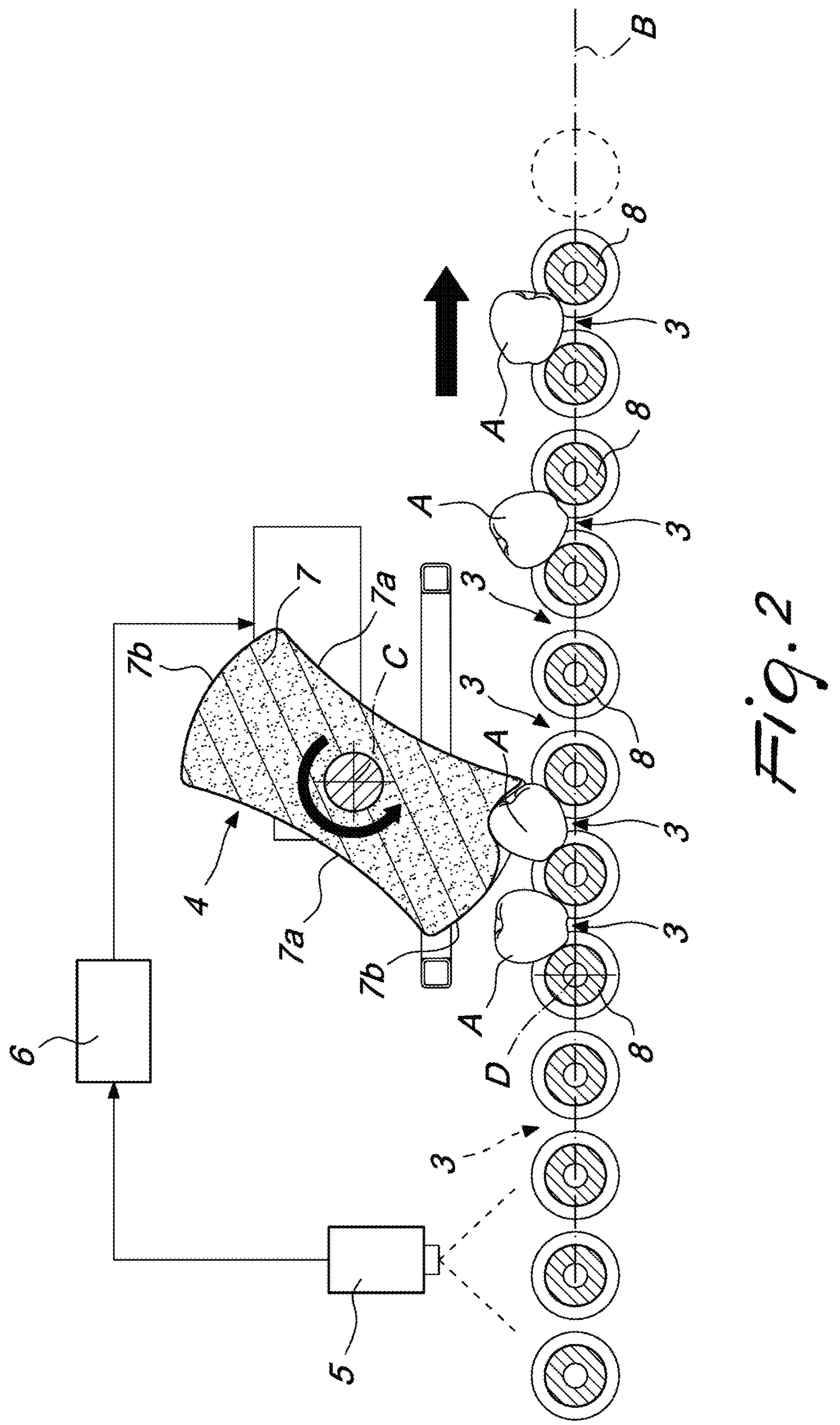
Figure 3:
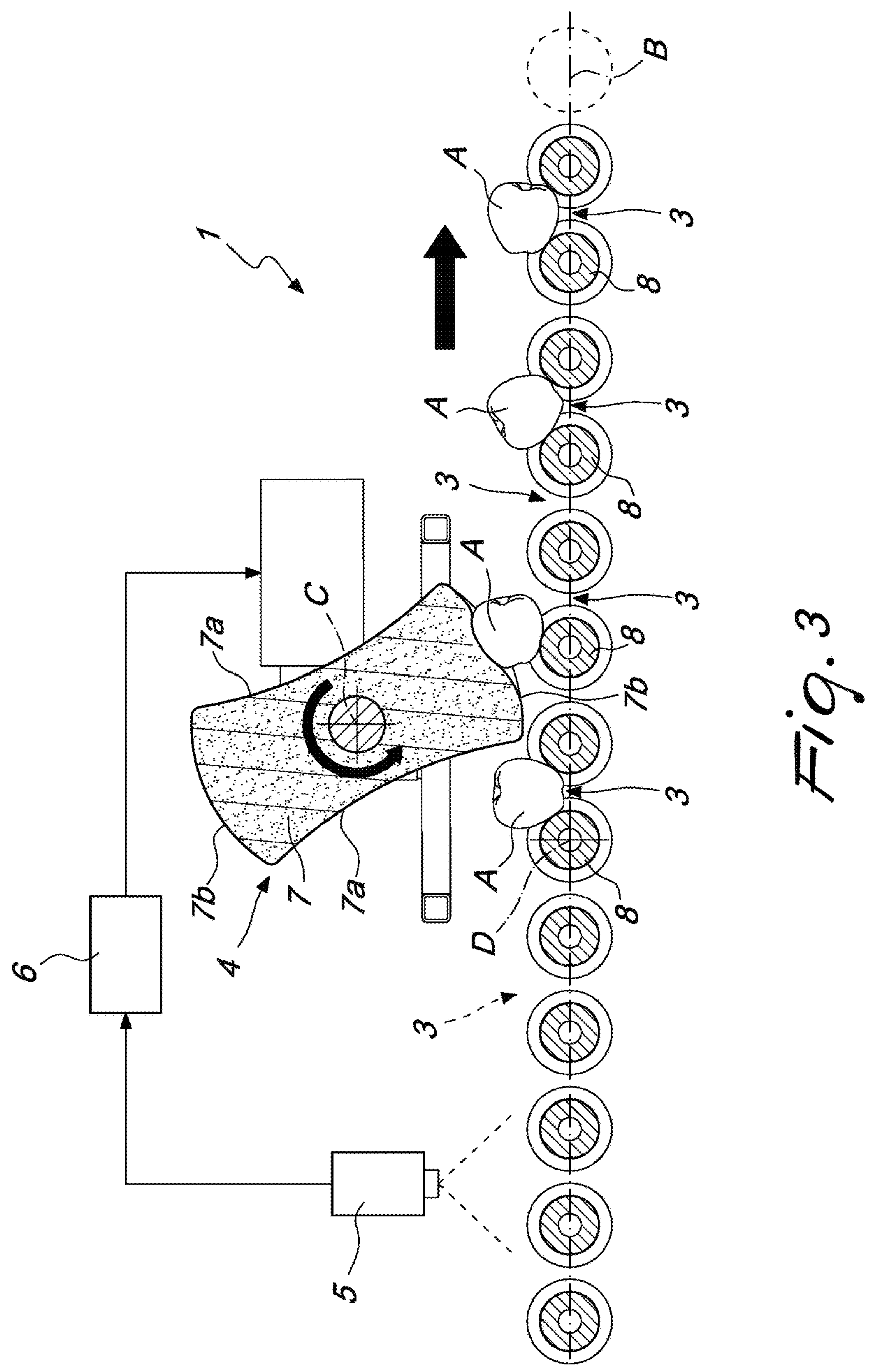
Figure 4:
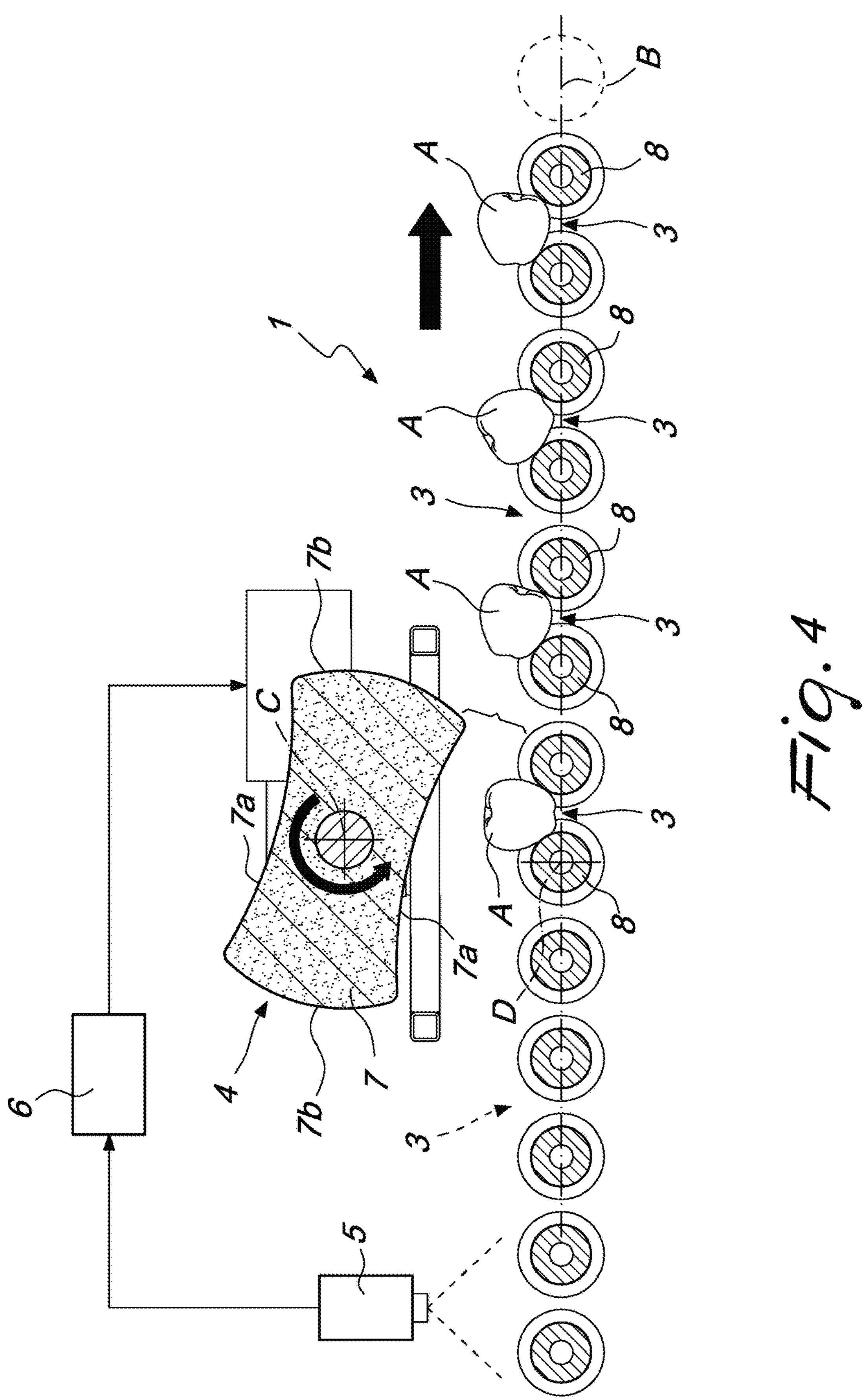
Figure 5:
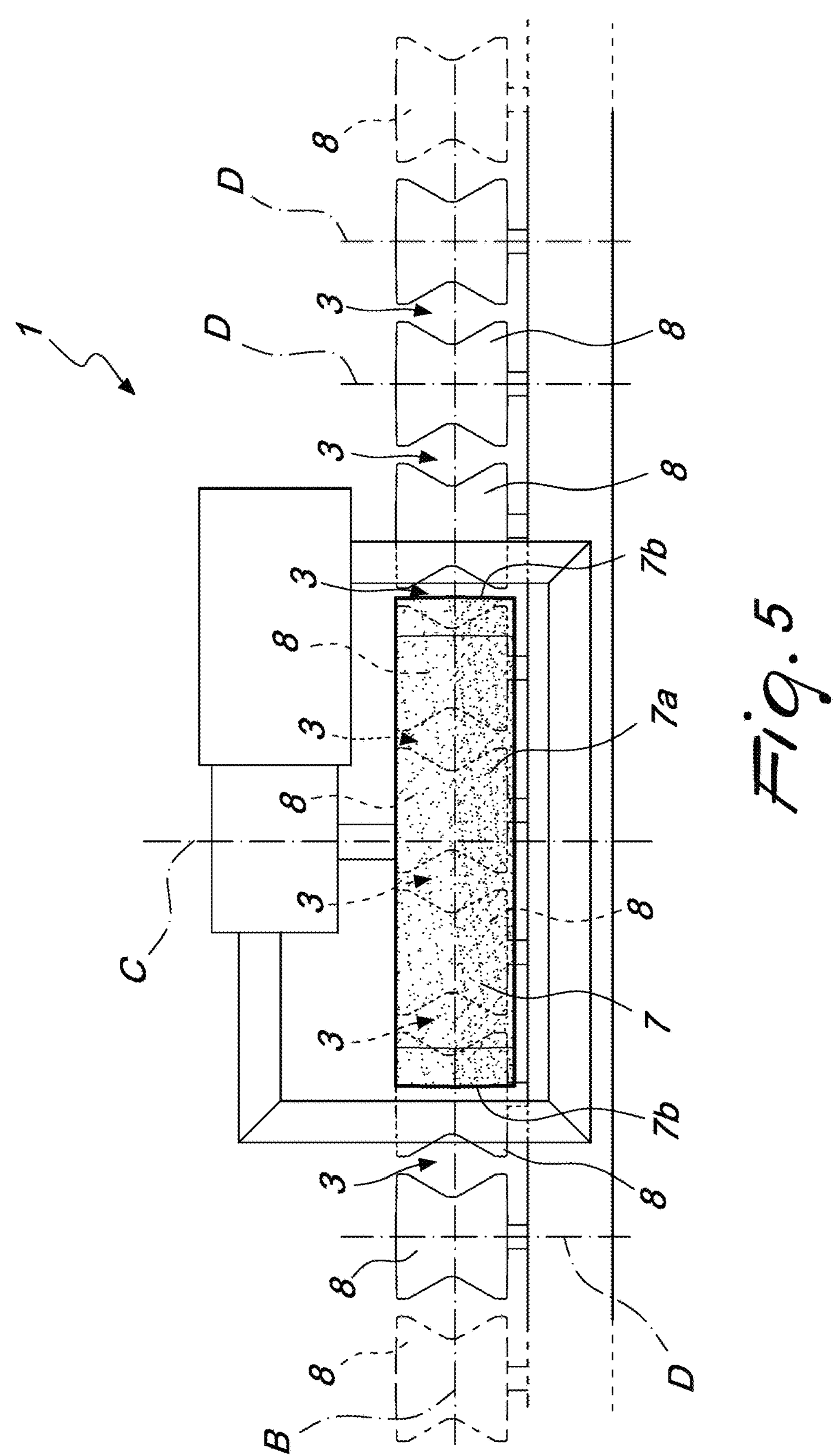
FIG. 5 is a top view of the assembly of FIG. 1.
Figures 6, 7:
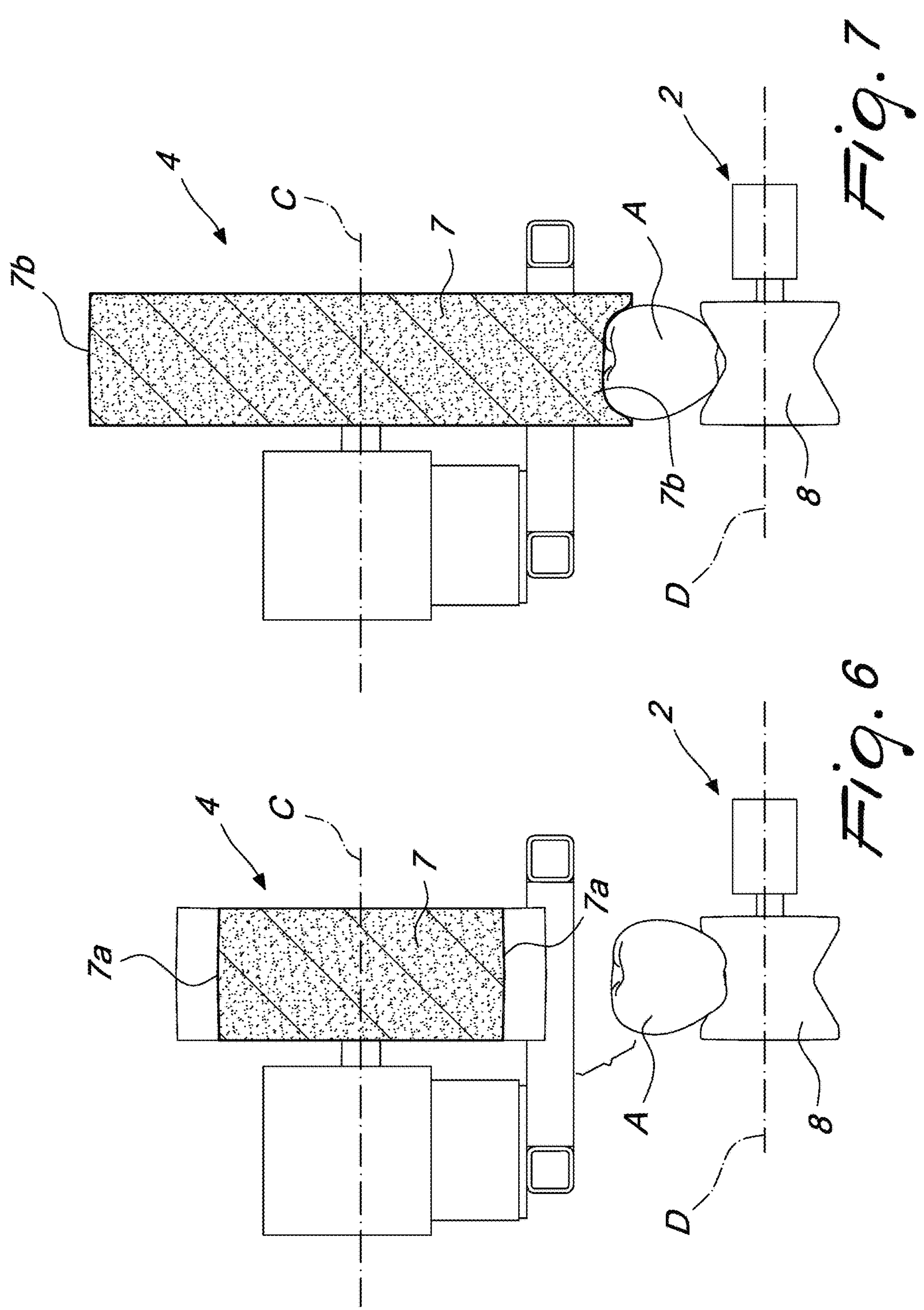
FIG. 6 is a front view of the assembly of FIG. 1.
FIG. 7 is a front view of the assembly of FIG. 1 as in FIG. 6, but in a different moment of operation.

Usefully, at least one surface layer of the actuator (be it the body 7 or of another type) is made of an elastically deformable material (as can be seen clearly from FIGS. 2, 3 and 7). This choice ensures maximum delicacy in the handling of the product A and is therefore highly appreciated if the latter belongs to a type that is particularly sensitive to impacts (such as indeed the apples of the accompanying figures).

Although other embodiments for the means 2 and the seats 3 are not excluded, in the preferred solution the means 2 comprise a plurality of substantially axially symmetric resting elements 8. Such elements 8 may be cylindrical rollers or may have another shape, for example of the type known in the field as "diabolo" (similar to a more or less flattened hourglass or in any case two mutually opposite truncated cones).

Such elements 8 are arranged so as to be aligned along the path B with a longitudinal axis of symmetry D which is oriented transversely to the plane of arrangement of the path B (and therefore parallel to the axis of rotation C). Therefore, in this preferred configuration each seat 3 is substantially formed between a respective pair of adjacent elements 8, the product A being located above the interspace between the (adjacent) elements 8, resting on the corresponding opposite fractions of the lateral surfaces of said elements 8. In FIGS. 1 to 4, the assembly 1 is shown in cross-section along a longitudinal plane indeed in order to be able to show in the best way the seats 3, the method of resting the products A on the elements 8 (which at that sectional plane have a smaller transverse cross-section) and also the action of the actuator for the transfer of the products from one seat 3 to the other.

It should be noted that for the sake of simplicity, in the accompanying FIGS. 1 to 5 a choice has been made to represent as path "B" the ideal line along which the interspaces (and therefore the elements 8) move.

In this context, the means 2 may comprise a chain, a ribbon, a belt or a similar traction element, in any case wound around a pinion moved directly or indirectly by a respective motor; the elements 8 may be coupled to said element and can be indeed entrained by the latter along the path B. These are in any case solutions per se of a known type and are therefore not shown, except schematically, in the accompanying figures.

In a different embodiment, the means 2 comprise a plurality of cups (or trays) which are arranged so as to be aligned along the path B and form in an upper region respective seats 3. The cups can be moved in a manner similar to the elements 8, and therefore by using chains, ribbon, belts or other similar traction elements.

It should be noted, in any case, that the means 2 and the seats 3 may be any without abandoning the protective scope claimed herein.

A method 100 for controlling the advancement of products A along said assembly 1 (wherein therefore the assembly 1 is provided with at least some of the specifications described above and at least with the means 2, the seats 3, the device 4, the system 5 and the unit 6) is a subject matter of the present description like the assembly 1 described so far.

The method 100 comprises a step a. of monitoring the distribution of the products A in the seats 3 along at least one portion of the path B (located upstream of the device 4). Monitoring may occur continuously or in any case with such a frequency as to allow to check the distribution of the products A along all seats 3 as they progressively move downstream. In particular, the monitoring, which can be performed for example by the system 5, has the task of verifying and promptly identifying the presence of products A arranged in at least two consecutive seats 3.

Subsequently, in the presence indeed of products A arranged in at least two consecutive seats 3, the method 100 comprises a step b. for transferring a product A toward an adjacent seat 3 which has no products A (by resorting to the device 4). The execution of step b. provides for use of the unit 6.

The operation of the assembly according to the disclosure has in fact already been shown: the products A are transported by the assembly 1 between two predefined stations for any purpose.

Along the path, each product A is placed in a respective seat 3 and the device 4 can be activated to reposition and space products A moving on consecutive seats 3, where indeed the occurrence of such an event is to be avoided (due to the requirements of said assembly 1 or of the downstream instruments and stations). The system 5 associated with an electronic unit 6 (separated or integrated with each other and/or with the device 4) in this regard take care of the monitoring of the position of the products A upon the activation of the device 4.

FIGS. 1 to 4 show a possible intervention of the device 4: two products A arrive positioned in consecutive seats 3 (on the left in FIG. 1) in the portion of path B affected by the device 4, which until then has been kept facing said path B with a first portion 7*a* of the lateral edge of the body 7. The presence of such products A activates the device 4 (for example, by virtue of the detection performed by the system 5 and managed by the unit 6), which turns around its own axis of rotation C, affecting a product A with a second portion 7*b* thereof (FIG. 2). The progressive rotation pushes forward downstream the first of the two products A (FIG. 3), which finally is repositioned in the downstream seat 3 (FIG. 4), bypassing the element 8 interposed between the two seats 3 involved.

It should be specified that in order to maximize productivity, the disclosure has a preferred application in filling conditions that are close to, but anyway lower than, 50%. Likewise, in addition to special operating conditions in which the percentage of filling is higher than this value not being excluded, it may occur that one is faced, even only temporarily, with significantly lower filling percentages, such as to produce a condition whereby all the products A arrive at the device 4 already adequately spaced. In the latter case, the device 4 simply stays inactive, in the configuration for free transit of the products A (as in FIG. 1, for example).

In practice it has been found that the assembly and the method according to the disclosure fully achieve the intended aim, since the use of a device 4 capable of transferring a product A from one seat 3 to an adjacent seat 3 ensure an orderly transfer of the products A, ensuring at the same time a suitable spacing between them, at least downstream of said device 4.

In greater detail, in the assembly 1 each product A is transferred into a seat 3 and the device 4 prevents the risk that products A arranged on two consecutive seats 3 might transit downstream of it. This therefore allows to remedy an incorrect positioning obtained upstream, for example by the instruments that have the task of delivering the products A to the assembly 1, or more generically of ensuring adequate spacing even when the upstream stations are unable to do so.

The choice to cover at least superficially the body 7 (or another actuator) with deformable material (at least in the part designed for contact with the products A) is a guarantee of the fact that the results described above are achieved without compromising the quality of the products A and without causing any damage to them.

The disclosure thus conceived is susceptible of numerous modifications and variations, all of which are within the scope of the appended claims; all the details may furthermore be replaced with other technically equivalent ones.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

The invention claimed is:

1. An assembly for conveyance of horticultural products, comprising moving means configured for moving, along a predefined path, a plurality of resting seats for respective horticultural products, which are aligned longitudinally along said path, said assembly comprising a device for repositioning the horticultural products, which is arranged along said path and is configured to transfer a horticultural product arranged in one of said resting seats into one of adjacent seats of said resting seats, further comprising a system for detecting horticultural products, which is arranged upstream of said device and is configured at least to verify presence of horticultural products arranged in at least two consecutive resting seats of said resting seats, and an electronic control and management unit, functionally associated with said system and with said device and configured for activation of said device as a consequence of the presence, detected by said system, of horticultural products arranged in at least two said consecutive resting seats.

2. The assembly according to claim 1, wherein said electronic unit is provided with instructions for controlling a transfer of a horticultural product, performed by said device, toward a said adjacent resting seat that contains no horticultural products.

3. The assembly according to claim 1, wherein said device comprises an actuator, which is arranged proximate to said path and which is configured to be activated selectively for the transfer of a horticultural product arranged in one of said resting seats into one of said adjacent resting seats.

4. The assembly according to claim 3, wherein said actuator comprises a contoured body, which is arranged above said path and rotates about an axis of rotation which is transverse to a plane of arrangement of said path, said contoured body being normally kept facing said path with at least one first portion of a lateral edge thereof, having a smaller radial distance, configured for a free transit of the horticultural products arranged in said resting seats, at least one second portion of the lateral edge of said body, having a greater radial distance, being configured to intercept a trajectory imposed on the horticultural products by said moving means and to transfer a horticultural product arranged in one of said resting seats toward one of said adjacent resting seats as a consequence of ae rotation of said contoured body in one of directions of rotation about said rotation axis.

5. The assembly according to claim 4, wherein said contoured body is substantially axially symmetric.

6. The assembly according to claim 4, wherein said lateral edge of said contoured body is substantially composed of two said first portions which face each other and are concave, and of two said second portions which face each other, are convex and are interposed between respective said first portions.

7. The assembly according to claim 3, wherein at least one surface layer of said actuator is made of an elastically deformable material.

8. The assembly according to claim 4, wherein said moving means comprise a plurality of substantially axially symmetric resting elements, which are arranged to be aligned along said path with a longitudinal axis of symmetry which is oriented transversely to the plane of arrangement of said path, each one of said seats being substantially formed between a respective pair of said adjacent elements, the horticultural product being arrangeable above an interspace between said elements to rest on corresponding mutually opposite fractions of the lateral surfaces of said axial symmetric resting elements.

9. The assembly according to claim 1, wherein said moving means comprise a plurality of cups which are arranged to be aligned along said path and form in an upper region respective said resting seats.

10. A method for controlling advancement of horticultural products along a conveyance assembly according to claim 1, the method including the following steps:

a. monitoring the distribution of the horticultural products in the seats along at least one portion of the path, and b. in the presence of products arranged in at least two consecutive resting seats, transferring a horticultural product toward an adjacent resting seat which has no horticultural products.

* * * * *